United States Patent
Numazawa et al.

(10) Patent No.: US 7,812,107 B2
(45) Date of Patent: Oct. 12, 2010

(54) WATER-BASED COATED-TYPE VIBRATION DAMPING MATERIAL

(75) Inventors: Masayuki Numazawa, Toyota (JP); Ken Tsuzuki, Toyota (JP); Yutaka Ohashi, Nissin (JP)

(73) Assignees: Aisin Kako Kabushiki Kaisha, Toyota-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 11/428,421

(22) Filed: Jul. 3, 2006

(65) Prior Publication Data

US 2007/0032586 A1 Feb. 8, 2007

(30) Foreign Application Priority Data

Jul. 1, 2005 (JP) ............................. 2005-193569
Jun. 12, 2006 (JP) ............................. 2006-162031

(51) Int. Cl.
*C08F 20/06* (2006.01)

(52) U.S. Cl. ................. 526/317.1; 526/318.4; 526/337; 526/346

(58) Field of Classification Search .............. 526/317.1, 526/346, 318.4, 337
See application file for complete search history.

(56) References Cited

U.S. PATENT DOCUMENTS

| | | | | |
|---|---|---|---|---|
| 3,056,707 | A | * | 10/1962 | Waggoner et al. ........... 181/286 |
| 4,282,131 | A | | 8/1981 | Trousil |
| 4,325,858 | A | | 4/1982 | Saito et al. |
| 6,686,033 | B1 | * | 2/2004 | Chacko ....................... 428/221 |
| 2004/0072943 | A1 | * | 4/2004 | Morihiro et al. ............ 524/556 |

FOREIGN PATENT DOCUMENTS

| | | | |
|---|---|---|---|
| CA | 1147879 | A | 6/1983 |
| DE | 102 18 607 | A1 | 11/2003 |
| EP | 1 484 367 | A1 | 12/2004 |
| JP | 07-292318 | * | 11/1995 |
| JP | 07-292318 | A | 11/1995 |
| JP | 08-209044 | | 8/1996 |
| JP | 9-151335 | A | 6/1997 |
| JP | 10-324822 | A | 12/1998 |
| JP | 11-334653 | A | 12/1999 |
| JP | 2001-64545 | A | 3/2001 |
| JP | 2001-152028 | * | 6/2001 |
| JP | 2001 152028 | * | 6/2001 |
| JP | 2001-152028 | A | 6/2001 |
| JP | 2003-42223 | A | 2/2003 |
| JP | 2004-115665 | A | 4/2004 |
| JP | 2005-187605 | A | 7/2005 |
| KR | 10-2004-0018462 | A | 3/2004 |

* cited by examiner

*Primary Examiner*—Ling-Siu Choi
(74) *Attorney, Agent, or Firm*—Buchanan Ingersoll & Rooney PC

(57) ABSTRACT

A water-based coated-type vibration damping material uses a styrene-butadiene copolymer emulsion as a resin emulsion and a calcium carbonate as an inorganic filler. The water-based coated-type vibration damping material limits a blending amount of a glycol to 2% by weight or less. In case of making a coated layer by such water-based coated-type vibration damping material, there is no blister generation observed after a hot water immersion of 168 hours (7 days), after a hot water immersion of 336 hours (14 days) and after a hot water immersion of 1000 hours, either.

8 Claims, 1 Drawing Sheet

WATER-BASED COATED-TYPE VIBRATION DAMPING MATERIAL

BACKGROUND OF THE INVENTION

1. Field of the Invention

The present invention relates to a water-based coated-type vibration damping material containing a resin emulsion and an inorganic filter, which is excellent in rigidity and vibration damping capability as well anti-blister capability, for use in a floor of a vehicle or the like.

2. Description of the Related Art

A sheet-shaped vibration damping material mainly composed of asphalt is disposed on a floor of a vehicle such as an automobile or the like in order to prevent vibration. However, in case of using such sheet-shaped vibration damping material in the vehicle or the like, the sheet material needs to be cut in conformity with a shape of an area on which it is laid and arranged. Then, a worker must place the cut sheet-shaped vibration damping material by hand. Thus, the conventional vibration damping material has become a bottleneck for automation and obstructed reduction of operation time. In view of such situation, as shown in Japanese Laid Open Patent Publication No. 2004-115665, there has been developed a coated-type vibration damping composition or a water-based emulsion for use in vibration damping that enables automation by a robot.

The publication No. 2004-115665 discloses an invention of a water-based emulsion for vibration damping material having a coagulation rate controlled within a fixed range. Where this emulsion is coated thickly as a vibration damping material and such thick coated layer is dried, the coated layer is dried and hardened from a surface. Then, it is prevented that a blister is produced or a crack is generated on the coated layer when water inside the coated layer evaporates. Thus, the emulsion improves a drying property of the coated layer formed as the vibration damping material.

The water-based emulsion for vibration damping material according to such conventional invention enables automation by robots and is able to shorten the operation time. Moreover, since the emulsion is a water-based coating material, it has also advantages that there are not generated any asphalt odor in conventional sheet-shaped vibration damping materials and any organic solvent odor in an organic solvent paint at the time of construction.

However, a propylene glycol is blended as an additive in 4.5% in the water-based emulsion for vibration damping material according to the publication No. 2004-115665. Therefore, if the coated-type vibration damping material is coated over a coated film of an electrodeposition paint provided on a vehicle body panel or the like and then baked, the propylene glycol swells and softens the electrodeposition film. Thereafter, when a hot water immersion is conducted thereon, the hot water invades the softened electrodeposition film so as to go into an interface between the electrodeposition film and a steel plate. Consequently, there are generated blisters or minute bumps or swellings on the electrodeposition film.

Such hot water immersion is easy to occur particularly in case a snow adhering to shoes is melted and warmed on a vehicle floor. Then, since water-based vibration damping coating materials often use a propylene glycol or ethylene glycol, there takes place a problem that blisters are generated on a base coated film of a vehicle or an electrodeposition film by the aforementioned mechanism.

BRIEF SUMMARY OF THE INVENTION

It is an object of the present invention to provide a water-based coated-type vibration damping material that enables an automated construction on a floor portion, a trunk room, a dash portion and so on of a vehicle by use of a painting robot and the like, while preventing blisters from generating even if it is immersed in a hot water by limiting a content of a glycol (dihydric alcohol) including a propylene glycol and so on.

According to a first aspect of the invention, there is provided a water-based coated-type vibration damping material that contains a resin emulsion and an inorganic filler and in which a dihydric alcohol (glycol) content is within a range of 0% by weight to not more than 2.0% by weight.

The resin emulsion may use an acrylic emulsion, an acrylic-styrene emulsion, a styrene-butadiene emulsion, a styrene-butadiene-latex (SBR) emulsion, a vinyl acetate emulsion, an ethylene-vinyl acetate emulsion, an ethylene-acrylic emulsion, an epoxy resin emulsion, an urethane resin emulsion, a phenol resin emulsion, a polyester resin emulsion, an acrylonitrile-butadiene-latex (NBR) emulsion and the like.

The inorganic filler may use a calcium carbonate, a talc, a diatomaceous earth, a barium sulfate, a zeolite, a magnesium carbonate, a mica, a graphite, a calcium silicate, a clay, a glass flake, a hillite, a caolinite and the like.

A typical dihydric alcohol (glycol) is an ethylene glycol, propylene glycol or the like.

The inventors devoted themselves to continuous experiments and study and finally found the following fact on the water-based coated-type vibration damping material that contains the resin emulsion and the inorganic filler. That is, in case the content of the dihydric alcohol (glycol) including the ethylene glycol or the propylene glycol in the water-based coated-type vibration damping material is not more than 2.9% by weigh in total, there are no blisters generated on a base coated film or electrodeposition film of a vehicle even if it is immersed in a hot water. Then, the inventors have finished the present invention on the basis of such knowledge.

Thus, the inventive water-based coated-type vibration damping material enables an automated construction on by use of a painting robot or the like on a floor portion, a trunk room, a dash portion and so on of a vehicle by use of a painting robot and the like. Moreover, since the content of the glycol (dihydric alcohol) is limited, there are no blisters generated even if it is immersed in the hot water.

In the aforesaid water-based coated-type vibration damping material, the resin emulsion may preferably be one that blends a first resin emulsion and a second resin emulsion, while a peak temperature (Tg) of a loss tangent (tan δ) of the first resin emulsion being within a range of 0° C. to 20° C. and a peak temperature (Tg) of a loss tangent (tan δ) of the second resin emulsion being within a range of 25° C. to 50° C.

The inventors were dedicated to keen continuous experiments and study further to find the following fact. That is, the first resin emulsion having the peak temperature (Tg) of the loss tangent (tan δ) within the range of 0° C. to 20° C. is blended with the second resin emulsion having the peak temperature (Tg) of the loss tangent (tan δ) within a range of 25° C. to 50° C., the water can be facilitated to be evaporated at an early stage in burning and drying a coated layer. Then, a swelling of the coated layer is more prevented at the time of burning and drying. Thus, there are no cracks or blisters under a burning and drying step conducted even on a very thick coated layer with a layer thickness of 8 mm. Consequently, there is obtained a hardened coated layer that is excellent in vibration damping performance. Then, the inventors have improved more the present invention on the basis of such knowledge.

Thus, the inventive water-based coated-type vibration damping material enables a thicker vibration damping coated layer to be constructed in addition to the above described advantageous effects.

In the aforesaid water-based coated-type vibration damping material, the resin emulsion may be preferably a styrene-butadiene emulsion and/or a acrylic acid ester emulsion and/or an ethylene-vinyl acetate emulsion.

Here, the wording "a styrene-butadiene emulsion and/or a acrylic acid ester emulsion and/or an ethylene-vinyl acetate emulsion" is used in a meaning that includes all of cases in which the resin emulsion or the first resin emulsion or the second resin emulsion consists only of the styrene-butadiene emulsion, consists only of acrylic acid ester emulsion, consists only of ethylene-vinyl acetate emulsion, consists of the styrene-butadiene emulsion and the acrylic acid ester emulsion, consists of the acrylic acid ester emulsion and the ethylene-vinyl acetate emulsion, consists of the styrene-butadiene emulsion and the ethylene-vinyl acetate emulsion, and consists of the styrene-butadiene emulsion, the acrylic acid ester emulsion and the ethylene-vinyl acetate emulsion.

The inventors further continued keen experiments and study thereby finding the following fact in addition. That is, one of the styrene-butadiene emulsion, the acrylic acid ester emulsion and the ethylene-vinyl acetate emulsion or a mixture of two or more of them is used, there is provided a vibration damping coated layer that is more superior both in the vibration damping performance and a rigidity. Then, the inventors have improved still more the present invention on the basis of such knowledge. Moreover, these three kinds of emulsions have advantages that they are easily obtained at low cost.

Thus, the inventive water-based coated-type vibration damping material enables a vibration damping coated layer more effective in the vibration damping performance to be built in addition to the above described advantageous effects.

In the aforesaid water-based coated-type vibration damping material, the inorganic filler may preferably be at least one selected from a group consisting of a calcium carbonate, a talc, a diatomaceous earth, a barium sulfate, a zeolite, a magnesium carbonate and a mica.

Each of these inorganic fillers is easily obtained at low cost. Moreover, they are compatible with the resin emulsion, thereby achieving an improved vibration damping characteristics.

Thus, the inventive water-based coated-type vibration damping material enables a vibration damping coated layer more effective in the vibration damping performance to be built and the costs to be reduced, in addition to the above described advantageous effects.

Further objects and advantages of the invention will be apparent from the following description, reference being had to the accompanying drawings, wherein preferred embodiments of the invention are clearly shown.

DETAILED DESCRIPTION OF THE INVENTION

Figure 1:
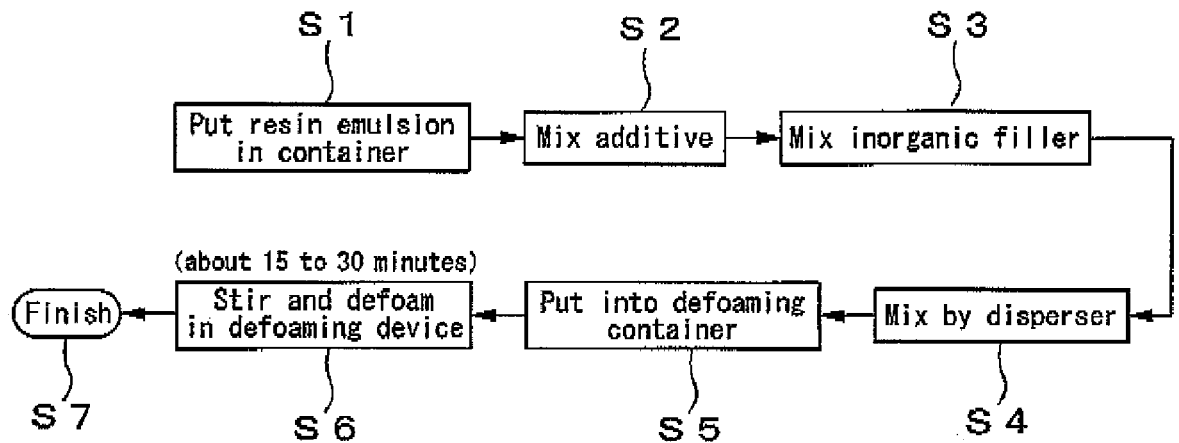
FIG. 1 is a flowchart showing a manufacturing method of a water-based coated-type vibration damping material according to a first embodiment of the invention.

Several embodiments of water-based coated-type vibration damping materials according to the invention are described hereunder.

First Embodiment

A manufacturing method of a water-based coated-type vibration damping material according to a first embodiment of the invention is described hereunder referring to a flowchart of FIG. 1. FIG. 1 shows the flowchart of the manufacturing method of the water-based coated-type vibration damping material according to the first embodiment of the invention. As shown in FIG. 1, a liquid resin emulsion is put in a container (resin cup or porcelain enamel beaker) in STEP S1. Next, an additive is added thereto in STEP S2. Next, an inorganic filler is mixed therein in STEP S3. Next, the mixture is dispersed and mixed by a disperser until it is uniformly mixed in STEP S4. Then, the mixture is moved and put into a container for defoaming in STEP S5. Thereafter, the mixture is located inside a defoaming device and stirred for about 15 minutes to about 30 minutes under a sucking operation of a vacuum pump so as to be defoamed in STEP S6. With the aforementioned steps, the manufacturing of the water-based coated-type vibration damping material is completed in STEP S7.

A composition or formulation of the water-based coated-type vibration damping material according to the first embodiment is described in detail hereunder. A styrene-butadiene emulsion is used as the resin emulsion. A calcium carbonate is used as the inorganic filler. A dispersing agent and an anti-drip agent are blended as the additive. Moreover, a glycol (propylene glycol or ethylene glycol) is blended in not more than 2% by weight. They are mixed so as to be 100% by weight in total.

A first working example to a seventh working example were manufactured, respectively, while changing a compounding ratio of these ingredients. Moreover, a first comparison example to a third comparison example were manufactured for comparison. Then, characteristic tests were conducted. Each of the compounding ratios of the first working example to the seventh working example as well as the first comparison example to the third comparison example are shown in Table 1 as a whole.

TABLE 1

| Component (% by weight) | Working Example | | | | | | | Comparison Example | | |
|---|---|---|---|---|---|---|---|---|---|---|
| | 1 | 2 | 3 | 4 | 5 | 6 | 7 | 1 | 2 | 3 |
| Resin emulsion (styrene-butadiene copolymer) Tg: 5° C. | 35 | 35 | 35 | 35 | 35 | 35 | 35 | 35 | 35 | 35 |
| Inorganic filler (calcium carbonate) | 61 | 60.5 | 60 | 59 | 60.5 | 60 | 59 | 58 | 58 | 58 |
| Other additives (dispersing agent) anti-dip agent) | 4 | 4 | 4 | 4 | 4 | 4 | 4 | 4 | 4 | 4 |

TABLE 1-continued

| Component (% by weight) | Working Example | | | | | | | Comparison Example | | |
|---|---|---|---|---|---|---|---|---|---|---|
| | 1 | 2 | 3 | 4 | 5 | 6 | 7 | 1 | 2 | 3 |
| Propylene glycol | — | 0.5 | 1 | 2 | — | — | — | 3 | — | 1.5 |
| Ethylene glycol | — | — | — | — | 0.5 | 1 | 2 | — | 3 | 1.5 |
| Anti-blister performance 168 H | G | G | G | G | G | G | G | NG | NG | NG |
| 336 H | G | G | G | G | G | G | G | NG | NG | NG |
| 1000 H | G | G | G | G | G | G | G | NG | NG | NG |

As shown in Table 1, a blending amount of the resin emulsion (styrene-butadiene copolymer emulsion) was made equal into 35% by weight in each of the first working example to the seventh working example and the first comparison example to the third comparison example. Moreover, a blending amount of the additive (dispersing agent, anti-drip agent) was made equal into 4% by weight in each of the working examples and the comparative examples. As the resin emulsion, a styrene-butadiene copolymer emulsion having a peak temperature (Tg) of a loss tangent (tan δ) of 5° C. (Tg=5° C.) was used. Then, a blending amount of the inorganic filler (calcium carbonate) was increased or decreased in accordance with a change of a blending amount of the glycol (propylene glycol, ethylene glycol) so that the total amount became 100% by weight.

As shown in Table 1, in the first working example, any glycol (propylene glycol or ethylene glycol) is not blended at all. Then, the inorganic filler (calcium carbonate) is blended in 61% by weight so that the total amount becomes 100% by weight.

In the second, the third and the fourth working examples, the propylene glycol is blended in 0.5% by weight, 1% by weight and 2% by weight, respectively, as the glycol. Accordingly, the blending amount of the inorganic filler (calcium carbonate) is gradually decreased to 60.5% by weight, 60% by weight and 59.5% by weight, respectively.

In the fifth, the sixth and the seventh embodiments, the ethylene glycol is blended in 0.5% by weight, 1% by weight and 2% by weight, respectively, as the glycol. Accordingly, the blending amount of the inorganic filler (calcium carbonate) is gradually decreased to 60.5% by weight, 60% by weight and 59.5% by weight, respectively.

In contrast, in the first comparison example, the ethylene glycol is blended in 3% by weight as the glycol. In the second comparison example, the ethylene glycol is blended in 3% by weight as the glycol. In the third comparison example, the ethylene glycol is blended in 1.5% by weight and the propylene glycol is blended in 1.5% by weight as the glycol so that they amount to 3% by weight. Accordingly, the blending amount of the inorganic filler (calcium carbonate) is made in 58% by weight.

In essence, the blending amount of the glycol is 2% by weight or less in each of the first to the seventh working embodiments. In contrast, the blending amount of the glycol is 3% by weight, i.e. more than 2% by weigh in each of the first to the third comparison examples.

Next, a test method of the characteristic tests (anti-blister characteristic test) is described.

A vehicle base coat film (electrodeposition film) was formed on an ED steel plate having a sized of 70 mm in width, 150 mm in length and 0.8 mm in thickness. Then, each of the working examples and the comparative examples of the coated-type vibration damping materials was coated on the ED plate with the base coat film so that a coating area size becomes 100 mm in width and 200 mm in length with an area density of 4 kg/m². Then, the steel plates coated respectively with the vibration damping materials were baked twice at 130° C. for 30 minutes thereby preparing test pieces. Thereafter, each of the test pieces was immersed in a hot water of 50° C. and pulled out after a predetermined time. Then, it was assessed if there were any blisters generated or not by visual observation. If no blister generation was observed, it was determined as "good (G)". If any blister generation was observed, it was determined as "no good (NG)". The test results are shown collectively in lower rows of Table 1.

As shown in Table 1, in any case of the water-based coated-type vibration damping materials with the blending of the first to the seventh working examples, no blister generation was observed after the hot water immersion of 168 hours (7 days), after the hot water immersion of 336 hours (14 days) and after the hot water immersion of 1000 hours, either. Thus, the water-based coated-type vibration damping materials according to the first embodiment has a superior vibration damping performance and a high anti-rust performance for the electrodeposition film.

In contrast, in each case of the water-based coated-type vibration damping materials with the blending of the first to the third comparative examples, blister generation was observed early or even after the hot water immersion of 168 hours (7 days). Consequently, the following fact was found in case of the blending amount of the glycol exceeded 2% by weight in the water-based coated-type vibration damping material. That is, in such case, the glycol makes the electrodeposition film swollen and softened. Then, the hot water invades the softened electrodeposition film by the hot water immersion thereafter and goes into an interface between the electrodeposition film and the steel plate, thereby causing blisters to be generated.

As described above, the water-based coated-type vibration damping material according to the first embodiment (each of first to seventh working examples) enables an automated construction on by use of a painting robot or the like on a floor portion, a trunk room, a dash portion and so on of a vehicle by use of a painting robot and the like. Moreover, since the content of the glycol (dihydric alcohol) is limited, there are no blisters generated even if it is immersed in the hot water. Furthermore, since the styrene-butadiene copolymer emulsion is used as the resin emulsion and the calcium carbonate is used as the inorganic filler, the vibration damping coated film made by such composition becomes more effective in the vibration damping characteristics and can be made at low cost.

Second Embodiment

A composition or formulation of a water-based coated-type vibration damping material according to a second embodiment of the invention is described in detail hereunder. The material uses a styrene-butadiene emulsion as a first resin emulsion that has a peak temperature (Tg) of a loss tangent (tan δ) within a range of 0° C. to 20° C. and an acrylic emulsion as a second resin emulsion that has a peak temperature (Tg) of a loss tangent (tan δ) within a range of 25° C. to 50° C. A calcium carbonate is used as the inorganic filler. A dispersing agent and an anti-drip agent are blended as the additive. Moreover, a glycol (propylene glycol or ethylene glycol) is blended in not more than 2% by weight. They are mixed so as to be 100% by weight in total.

An eighth working example to a fourteenth working example were manufactured, respectively, while changing a compounding ratio of these ingredients. A manufacturing method of the water-based coated-type vibration damping material is the same as that of the first embodiment shown in FIG. 1. Each of the compounding ratios of the eighth working example to the fourteenth working example are shown in Table 2 as a whole.

TABLE 2

| Component(% by weight) | Working Example | | | | | | |
|---|---|---|---|---|---|---|---|
| | 8 | 9 | 10 | 11 | 12 | 13 | 14 |
| First resin emulsion (styrene-butadiene copolymer) Tg: 5° C. | — | 10 | 20 | 30 | 10 | 20 | 30 |
| Second resin emulsion (acrylic emulsion) Tg: 25° C. | 35 | 25 | 15 | 5 | 25 | 15 | 5 |
| Inorganic filler (calcium carbonate) | 61 | 60.5 | 60 | 59 | 60.5 | 60 | 59 |
| Other additives (dispersing agent, anti-dip agent) | 4 | 4 | 4 | 4 | 4 | 4 | 4 |
| Propylene glycol | — | 0.5 | 1 | 2 | — | — | — |
| Ethylene glycol | — | — | — | — | 0.5 | 1 | 2 |
| Anti-blister performance  168 H | G | G | G | G | G | G | G |
| 336 H | G | G | G | G | G | G | G |
| 1000 H | G | G | G | G | G | G | G |

As shown in Table 2, a blending amount of a total of the first resin emulsion (styrene-butadiene copolymer emulsion) and the second resin emulsion (acrylic emulsion) was made equal into 35% by weight in each of the eighth working example to the fourteenth working example. Moreover, a blending amount of the additive (dispersing agent anti-drip agent) was made equal into 4% by weight in each of the working examples. As the first resin emulsion, a styrene-butadiene copolymer emulsion having a peak temperature (Tg) of a loss tangent (tan δ) of 5° C. (Tg=5° C.) was used. As the second resin emulsion, an acrylic emulsion having a peak temperature (Tg) of a loss tangent (tan δ) of 25° C. (Tg=25° C.) was used. Then, a blending amount of the inorganic filler (calcium carbonate) was increased or decreased in accordance with a change of a blending amount of the glycol (propylene glycol, ethylene glycol) so that the total amount became 100% by weight.

As shown in Table 2, in the eighth working example, any glycol (propylene glycol or ethylene glycol) is not blended at all. Then, the inorganic filler (calcium carbonate) is blended in 61% by weight so that the total amount becomes 100% by weight. Moreover, in the eighth working example, only the second resin emulsion (acrylic emulsion having Tg=25° C.) is used as the resin emulsion. That is, the eighth working example is shown as a blending example that uses only one kind of resin emulsion among the blending examples of the eighth working example to the fourteenth working example.

In the ninth, the tenth and the eleventh working examples, the propylene glycol is blended in 0.5% by weight, 1% by weight and 2% by weight, respectively, as the glycol. Accordingly, the blending amount of the inorganic filler (calcium carbonate) is gradually decreased to 60.5% by weight, 60% by weight and 59.5% by weight, respectively. Moreover, the blending amount of the first resin emulsion (styrene-butadiene copolymer emulsion) is gradually increased to 10% by weight, 20% by weight and 30% by weight, respectively. Accordingly, the blending amount of the second resin emulsion (acrylic emulsion) is gradually decreased to 25% by weight, 15% by weight and 5% by weight, respectively.

In the twelfth, the thirteenth and the fourteenth embodiments, the ethylene glycol is blended in 0.5% by weight, 1% by weight and 2% by weight, respectively, as the glycol. Accordingly, the blending amount of the inorganic filler (calcium carbonate) is gradually decreased to 60.5% by weight, 60% by weight and 59.5% by weight, respectively. Moreover, the blending amount of the first resin emulsion (styrene-butadiene copolymer emulsion) is gradually increased to 10% by weight, 20% by weight and 30% by weight, respectively. Accordingly, the blending amount of the second resin emulsion (acrylic emulsion) is gradually decreased to 25% by weight 15% by weight and 5% by weight respectively.

An anti-blister characteristic test was conducted on the above water-based coated-type vibration damping materials in the same manner as the first embodiment. That is, a vehicle base coat film (electrodeposition film) was formed on an ED steel plate having a sized of 70 mm in width, 150 mm in length and 0.8 mm in thickness. Then, each of the working examples and the comparative examples of the coated-type vibration damping materials was coated on the ED plate with the base coat film so that a coating area size becomes 100 mm in width and 200 mm in length with an area density of 4 kg/m². Then, the steel plates coated respectively with the vibration damping materials were baked twice at 130° C. for 30 minutes thereby preparing test pieces. Thereafter, each of the test pieces was immersed in a hot water of 50° C. and pulled out after a predetermined time. Then, it was assessed if there were any blisters generated or not by visual observation. If no blister generation was observed, it was determined as "good (G)". If any blister generation was observed, it was determined as "no good (NG)". The test results are shown collectively in lower rows of Table 2.

As shown in Table 2, in any case of the water-based coated-type vibration damping materials with the blending of the eighth to the fourteenth working examples, no blister generation was observed after the hot water immersion of 168 hours (7 days), after the hot water immersion of 336 hours (14 days) and after the hot water immersion of 1000 hours, either. Thus, the water-based coated-type vibration damping materials according to the first embodiment has a superior vibration damping performance and a high anti-rust performance for the electrodeposition film.

In addition, in the ninth working example to the fourteenth working example in the second embodiment, the resin emulsion is composed of the first resin emulsion and the second resin emulsion. The first resin emulsion has the peak temperature (Tg) within the range of 0° C. to 20° C., while the second resin emulsion has the peak temperature (Tg) within the range of 25° C. to 50. Consequently, the water can be facilitated to be evaporated at an early stage in burning and drying the coated layer. Then, a swelling of the coated layer is more prevented at the time of burning and drying. Thus, there are no cracks or blisters under a burning and drying step conducted even on a very thick coated layer with a layer thickness of 8 mm. Consequently, there is obtained a hardened coated layer that is excellent in vibration damping performance.

Each of the above-mentioned embodiments describes the working examples that uses the styrene-butadiene copolymer emulsion and the acrylic emulsion as the resin emulsion. Still, in addition to them, the resin emulsion may use an acrylic-styrene emulsion, a styrene-butadiene-latex (SBR) emulsion, a vinyl acetate emulsion, an ethylene-vinyl acetate emulsion, an ethylene-acrylic emulsion, an epoxy resin emulsion, an urethane resin emulsion, a phenol resin emulsion, a polyester resin emulsion, an acrylonitrile-butadiene-latex (NBR) emulsion and the like.

Moreover, each of the above-mentioned embodiments uses the calcium carbonate as the inorganic filler. Still, in addition to it, the inorganic filler may use a talc, a diatomaceous earth, a barium sulfate, a zeolite, a magnesium carbonate, a mica, a graphite, a calcium silicate, a clay, a glass flake, a hillite, a caolinite and the like.

The present invention is not limited to the above-mentioned embodiments in another features such as its composition, component, compounding ratio, material, size, manufacturing method or the like.

The preferred embodiments described herein are illustrative and not restrictive, the scope of the invention being indicated in the appended claims and all variations which come within the meaning of the claims are intended to be embraced therein.

The invention claimed is:

1. A water-based vibration damping material suitable for being coated over a coated film of an electrodeposition paint provided on a substrate and then baked,
    the water-based vibration damping material comprising a resin emulsion, an inorganic filler, and a dihydric alcohol,
    wherein the dihydric alcohol content is in a range of more than 0 wt. % to not more than 2.0 wt. %; and
    wherein the resin emulsion comprises a first resin emulsion and a second resin emulsion, wherein a peak temperature of a loss tangent of the first resin emulsion is within a range of 0° C. to 20° C., and a peak temperature of a loss tangent of the second resin emulsion is within a range of 25° C. to 50° C.

2. A water-based vibration damping material according to claim 1, in which the first resin emulsion comprises a styrene-butadiene emulsion and/or an acrylic acid ester emulsion and/or an ethylene-vinyl acetate emulsion having the peak temperature of the loss tangent within the range of 0° C. to 20° C., and wherein the second resin emulsion comprises a styrene-butadiene emulsion and/or an acrylic acid ester emulsion and/or an ethylene-vinyl acetate emulsion having the peak temperature of the loss tangent within the range of 25° C. to 50° C.

3. A water-based vibration damping material according to claim 1, in which the inorganic filler comprises at least one selected from the group consisting of a calcium carbonate, a talc, a diatomaceous earth, a barium sulfate, a zeolite, a magnesium carbonate and a mica.

4. A water-based vibration damping material according to claim 1, wherein the first resin emulsion comprises at least one selected from the group consisting of a styrene-butadiene copolymer, an acrylic-styrene emulsion, a styrene-butadiene-latex emulsion, a vinyl acetate emulsion, an ethylene-vinyl acetate emulsion, an ethylene-acrylic emulsion, an epoxy resin emulsion, an urethane resin emulsion, a phenol resin emulsion, a polyester resin emulsion and an acrylonitrile-butadiene-latex emulsion, wherein the second resin emulsion comprises at least one selected from the group consisting of an acrylic emulsion, an acrylic-styrene emulsion, a styrene-butadiene-latex emulsion, a vinyl acetate emulsion, an ethylene-vinyl acetate emulsion, an ethylene-acrylic emulsion, an epoxy resin emulsion, an urethane resin emulsion, a phenol resin emulsion, a polyester resin emulsion and an acrylonitrile-butadiene-latex emulsion.

5. A water-based vibration damping material according to claim 1, wherein the first resin emulsion comprises a styrene-butadiene copolymer having the peak temperature of the loss tangent within the range of 0° C. to 20° C., wherein the second resin emulsion comprises an acrylic emulsion having the peak temperature of the loss tangent within the range of 25° C. to 50° C.

6. A water-based vibration damping material according to claim 1, wherein the dihydric alcohol content is in a range from 0.5 wt. % to 2.0 wt. %.

7. A water-based vibration damping material according to claim 1, wherein the dihydric alcohol content is in a range from 1.0 wt. % to 2.0 wt. %.

8. A method of forming a layer from the water-based vibration damping material according to claim 1, comprising drying a layer formed from the water-based vibration damping material, wherein water in the layer is evaporated during drying, and wherein no cracks or blisters are present in the layer after drying.

* * * * *